(12) United States Patent
Cooper

(10) Patent No.: US 7,278,622 B2
(45) Date of Patent: Oct. 9, 2007

(54) WRITING AND READING TABLE FOR A BATHTUB

(75) Inventor: Kim M. Cooper, Westminster, CA (US)

(73) Assignee: Kim Marie Cooper, Westminster, CA (US)

( * ) Notice: Subject to any disclaimer, the term of this patent is extended or adjusted under 35 U.S.C. 154(b) by 246 days.

(21) Appl. No.: 10/770,835

(22) Filed: Jan. 28, 2004

(65) Prior Publication Data

US 2005/0160525 A1 Jul. 28, 2005

(51) Int. Cl.
*A47G 1/24* (2006.01)
(52) U.S. Cl. ............ 248/457; 248/153; 248/161; 248/441.1
(58) Field of Classification Search .......... 4/559; 248/457, 910, 146, 153, 161, 415, 441.1, 248/449

See application file for complete search history.

(56) References Cited

U.S. PATENT DOCUMENTS

| 3,606,235 | A | * | 9/1971 | Young | ............ 248/457 X |
| 5,761,753 | A | * | 6/1998 | Talbert | ............ 4/559 |
| 6,520,354 | B1 | * | 2/2003 | Skvorecz | ............ 248/153 X |
| 6,598,839 | B2 | * | 7/2003 | Loughman | ............ 248/441.1 X |

* cited by examiner

*Primary Examiner*—Robert M. Fetsuga

(57) ABSTRACT

A mechanism for support writing and reading materials in a bath comprising: a base member having an arced bottom to support the mechanism; a vertically extending pole member extending upward from the base; a horizontal bar member affixed at a swivel to the top of the vertically extending pole members; a second horizontal bar member pivotally affixed to the first horizontal bar member; and a support table affixed to the second horizontal bar member.

1 Claim, 8 Drawing Sheets

WRITING AND READING TABLE FOR A BATHTUB

FIELD OF THE INVENTION

The present invention is directed to devices which enable individuals to conveniently read and write in a variety of places such as the bathtub, while lying on a couch or in bed.

BACKGROUND OF THE INVENTION

Long luxurious baths are a great source of relaxation for millions of people. Reading or writing in the bathtub, while a source of enjoyment, has always been problematic because it is often difficult to keep writing materials and books dry. There are a number of devices which relate to facilitating the ability of individuals to read and/or write in a bathtub. The patent literature discloses a number of prior art systems which show or disclose the use of tables or supports in a bathtub.

U.S. Pat. No. 5,761,753, for example, discloses a device for enabling a person, while bathing, to perform other activities including reading, writing, smoking and drinking. The device comprises: a main support bar having a telescoping support tube slidably and adjustably mounted therein, the main support bar being arranged to be pivotally mounted on a tub and the telescoping support tube being arranged to be releasably mounted on a tub; a clamping-bracket to pivotally mount one end of the main support bar onto a tub; a releasable mounting to releasably mount the telescoping support tube onto a tub; and a book holder supported by a support ledger onto the main support bar/telescoping support tube combination, the book holder having a pen/pencil holder built therein.

U.S. Pat. No. 5,707,036 discloses a bathtub book holding device that includes a bathtub rim clamping member with adjustable grasping legs and a top platform circular post to telescopically receive a T-shaped tubular connector which also receives telescopically a supporting beam member affixed to a rectangular planar book supporting member; the T-shaped connector replaceable with offset adjustable and non adjustable cross fittings to enhance vertical, horizontal and angular rectangular planar book supporting member ideal placement.

U.S. Pat. No. 5,669,313 discloses a device for erectly supporting an open book on a bathtub. The device has a planar member adapted to slide on the top side portion of the bath tub which has a length extending generally across the width of the bathtub, and a lateral trough extending across a central front portion thereof adapted to erectly support the open book. In the preferred embodiment the device is molded from plastic and has a peripheral top rim in which handles are formed therein on opposite ends. Two curved ridges adapted to extend below the top rim of the bathtub and maintain the tub table on the tub when it is slid therealong, extend downwardly from the bottom side portion of the tub table. The curved ridges may have feet on opposite ends to support the Tub Table on a supporting surface when it is not positioned on the bathtub.

U.S. Pat. No. D330,985 discloses an ornamental design for a bathtub shelf.

U.S. Pat. No. 4,199,125 discloses a reading stand for use in the bathtub on which is mounted a transparent waterproof container that holds the reading material and which has clips that are used to turn the pages without wetting them.

As can be seen from the above, most of the prior devices are complicated and cumbersome. It would be desirable to provide a movable and adjustable system which can be easily placed and adjusted to hold written material in or in association with a bath tub.

It would be desirable to provide a bathtub table mechanism which can be manufactured from a variety of materials.

It would be desirable to provide a table mechanism which can easily pivot to easily adjust for persons of different heights.

These and other objects of the present invention will become apparent from the detailed description which follows.

SUMMARY OF THE INVENTION

In accordance with the present invention, a mechanism for supporting writing and reading materials in a bath comprising: a base member having an arced bottom to support the mechanism; a vertically extending pole member extending upward from the base; a horizontal bar member affixed at a swivel to the top of the vertically extending pole member; a second horizontal bar member pivotably affixed to the first horizontal bar member; and a support table affixed to the second horizontal bar member.

In a further embodiment, the invention is a mechanism for supporting writing and reading materials in a bath comprising: a base member having an arced bottom; a vertically extending telescoping pole member extending upward from the base; a horizontal bar member affixed at a swivel to the top of the telescoping vertically extending pole members; a second horizontal bar member pivotably affixed to the first horizontal bar member; and a support table affixed to the second horizontal bar member.

In still a further embodiment, the invention is a mechanism for support writing and reading materials in a bath comprising: a base member having an arced bottom; a vertically extending telescoping pole member extending upward from the base; a horizontal bar member affixed at a swivel to the top of the telescoping vertically extending pole members; a second horizontal bar member pivotably affixed to the first horizontal bar member; and a support table affixed to the second horizontal bar member.

A BRIEF DESCRIPTION OF THE DRAWINGS

DETAILED DESCRIPTION OF THE INVENTION

Figure 1:
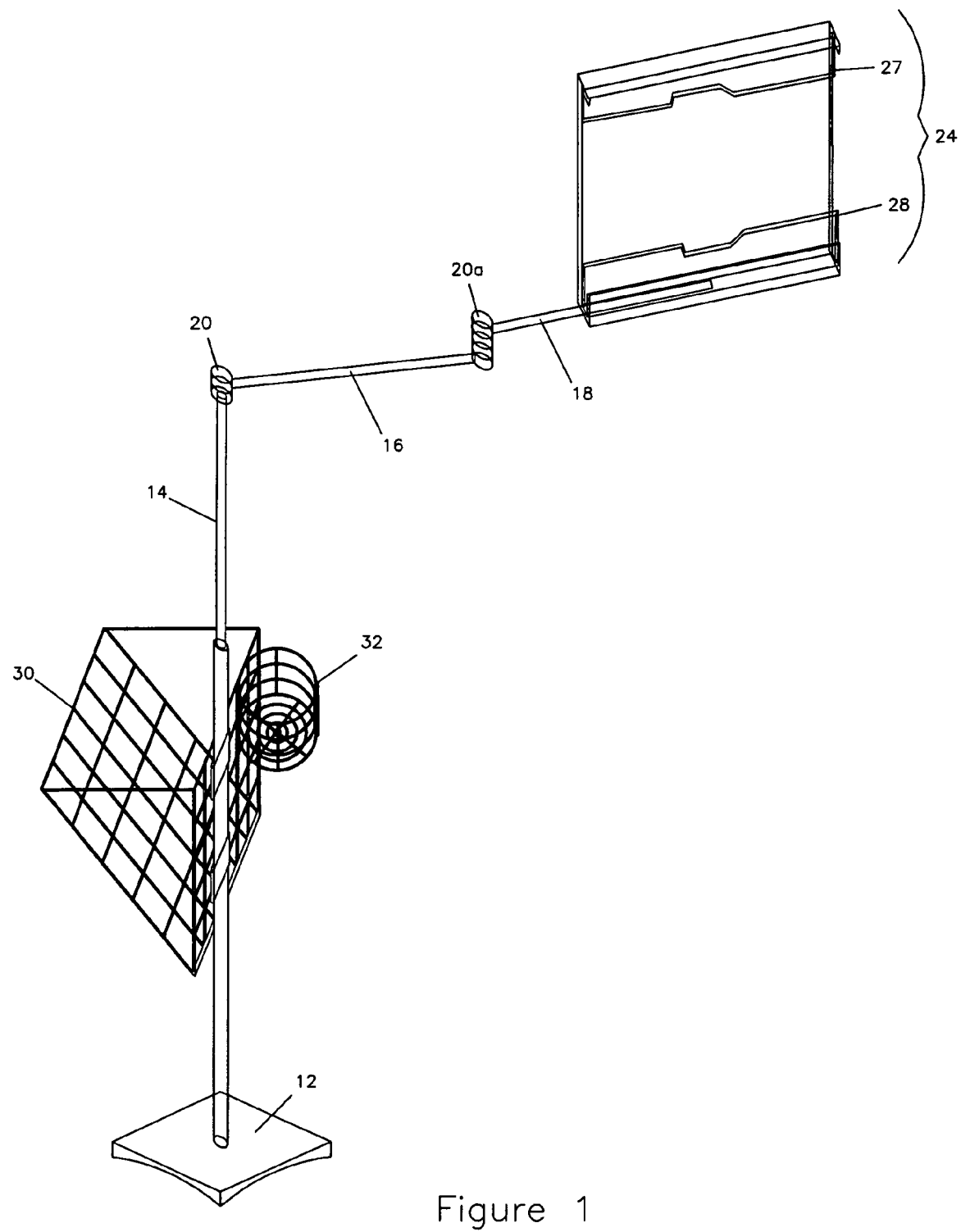
FIG. 1 is a perspective view of the present invention.

The present invention is described with reference to the enclosed figures wherein the same numerals are applicable. As shown in FIG. 1, the present invention is directed to a device 10 for holding and supporting reading and writing materials.

Referring to FIG. 1, the present invention is a mechanism 10 enabling a bather to read or write in a bathtub. The invention comprises a weighted base member 12. As shown in FIG. 1, the bottom of the base member 12 is arched at its bottom so as to be supported on the ground. The weighted base member 12 is preferably constructed from a material such as stainless steel.

As shown in FIG. 1, in a most preferred embodiment, the base-member 12 has a vertically extending telescoping pole 14 connected to the base member 12 and extending upward. The pole telescopes 14a so as to permit adjustment of the height of the unit.

The top of the vertically extending telescoping pole 14 is attached to two horizontally extending bar members 16, 18. Each of the bar members 16, 18 is affixed to a swivel pivot 20, 20a. The first horizontal bar member is connected at one end to a pivot affixed to the top of the vertical pole 14. The first bar member 16 swivels on a first pivot. The second horizontal bar member 18 is affixed to the secondary swivel pivot 20a.

Figure 2:
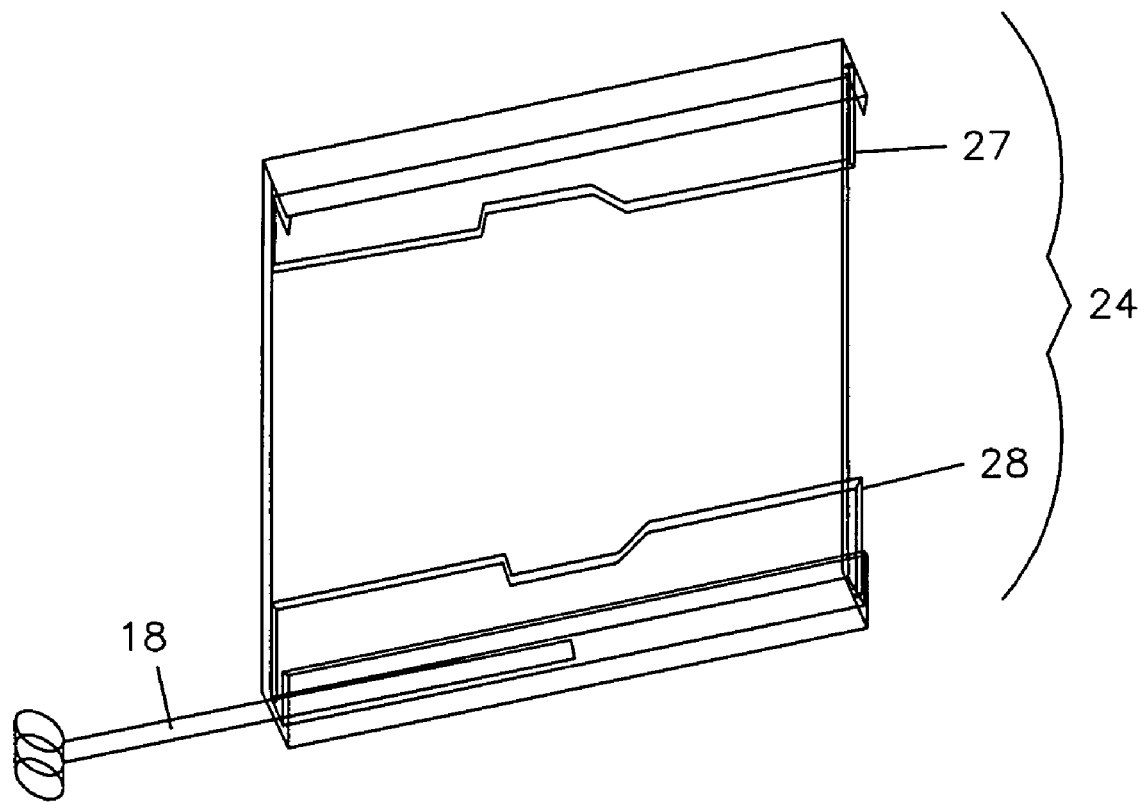
FIG. 2 is an isolated perspective view of the support table of the present invention.
Figure 3:
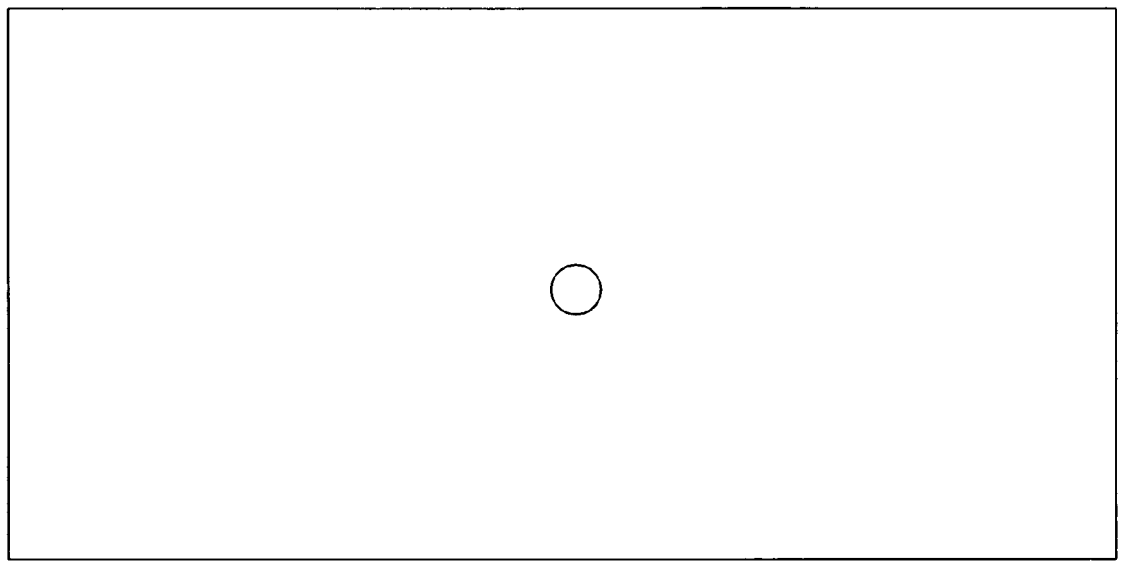
FIG. 3 is a plan view of the bottom of the base of the present invention.
Figure 4:
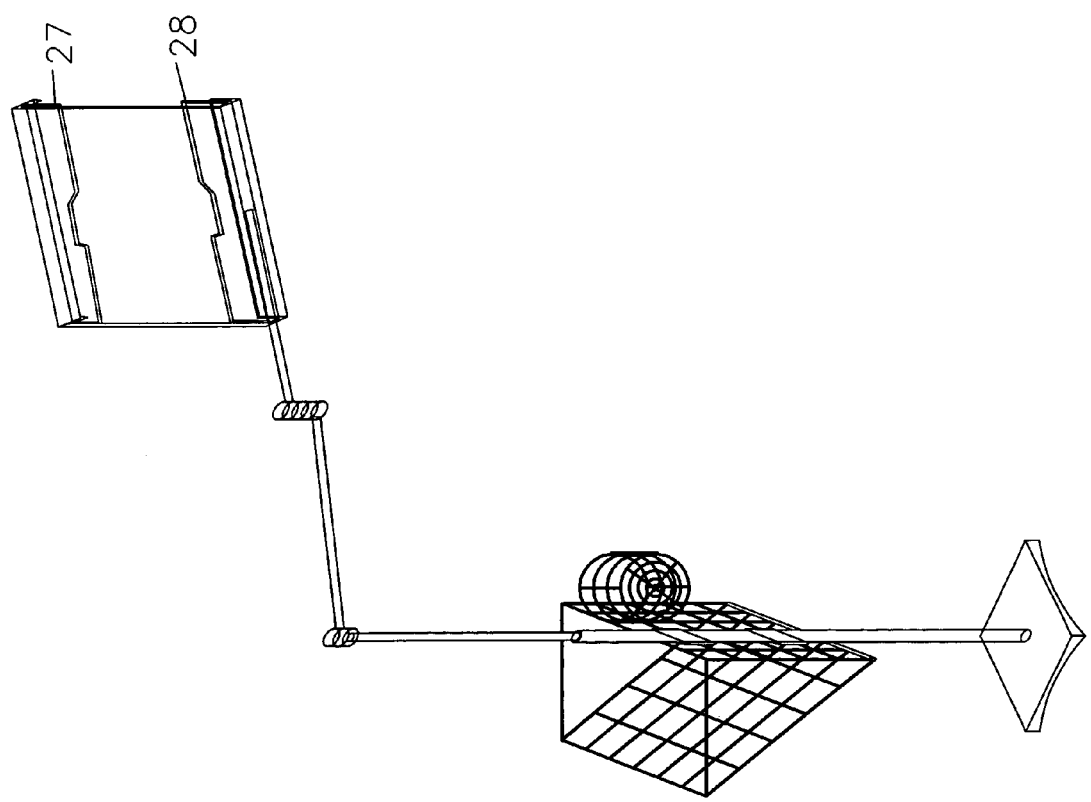
FIG. 4 is a perspective view of the present invention.
Figure 5:
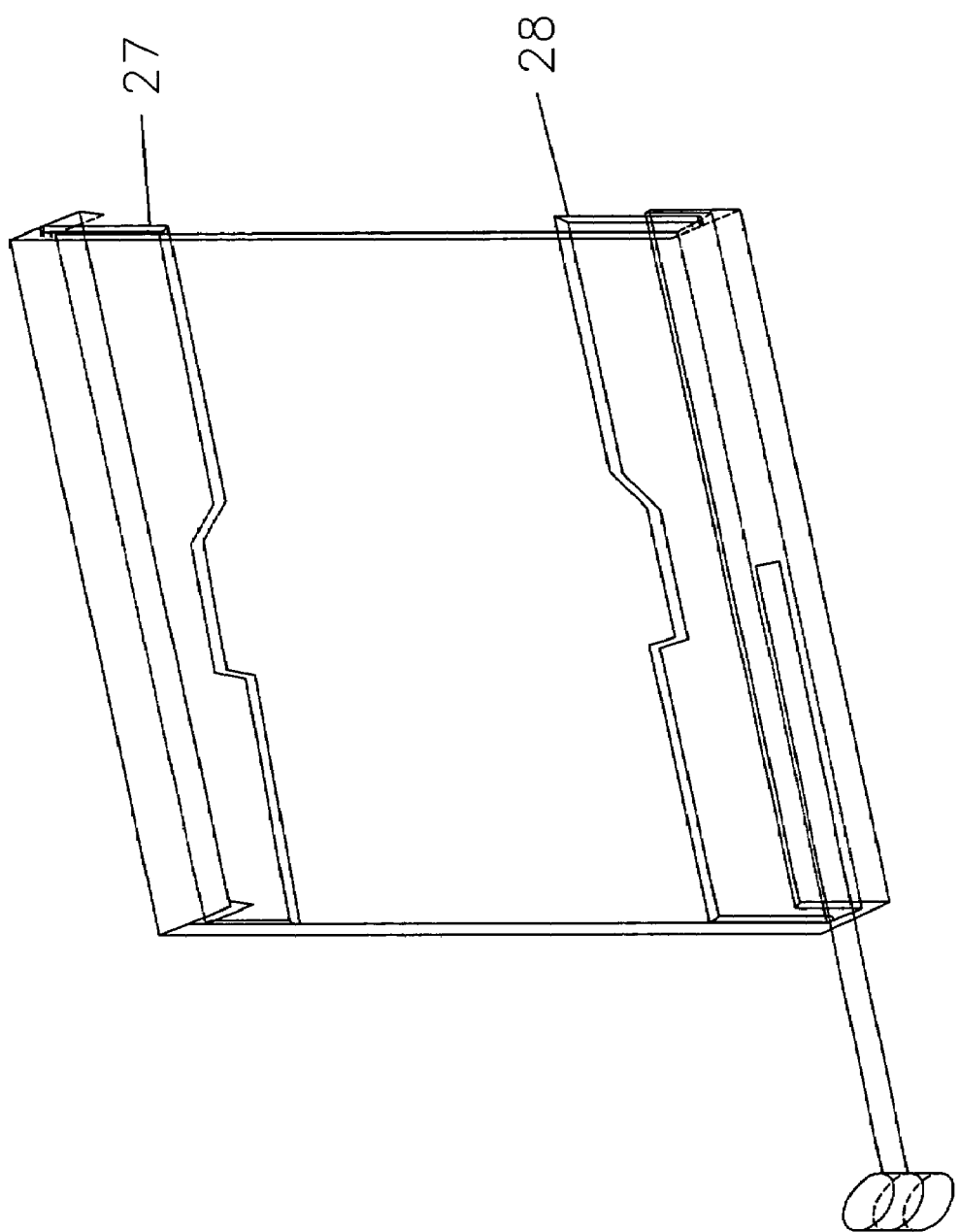
FIG. 5 is an isolated view of the table top of the present invention.
Figure 6:
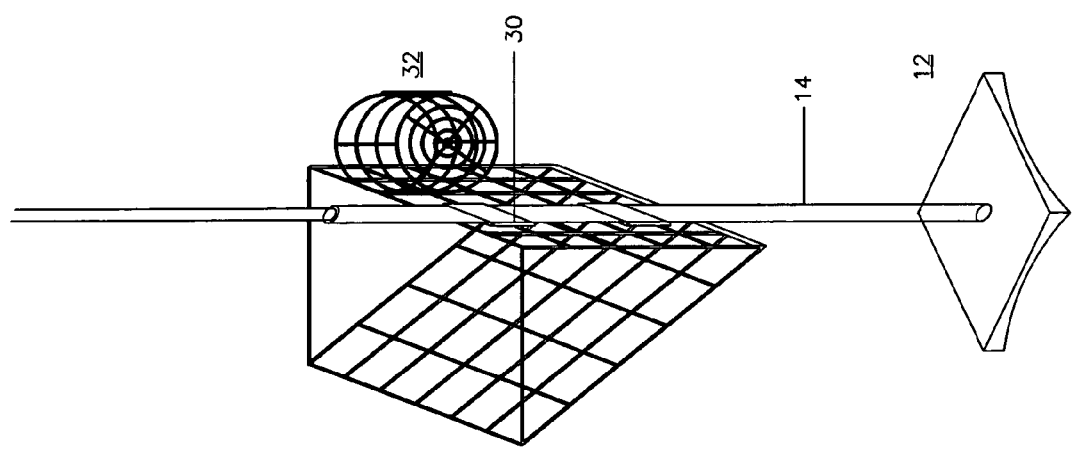
FIG. 6 is an isolated view of the table top of the pen/cup holder and magazine holder of the present invention.
Figure 7:
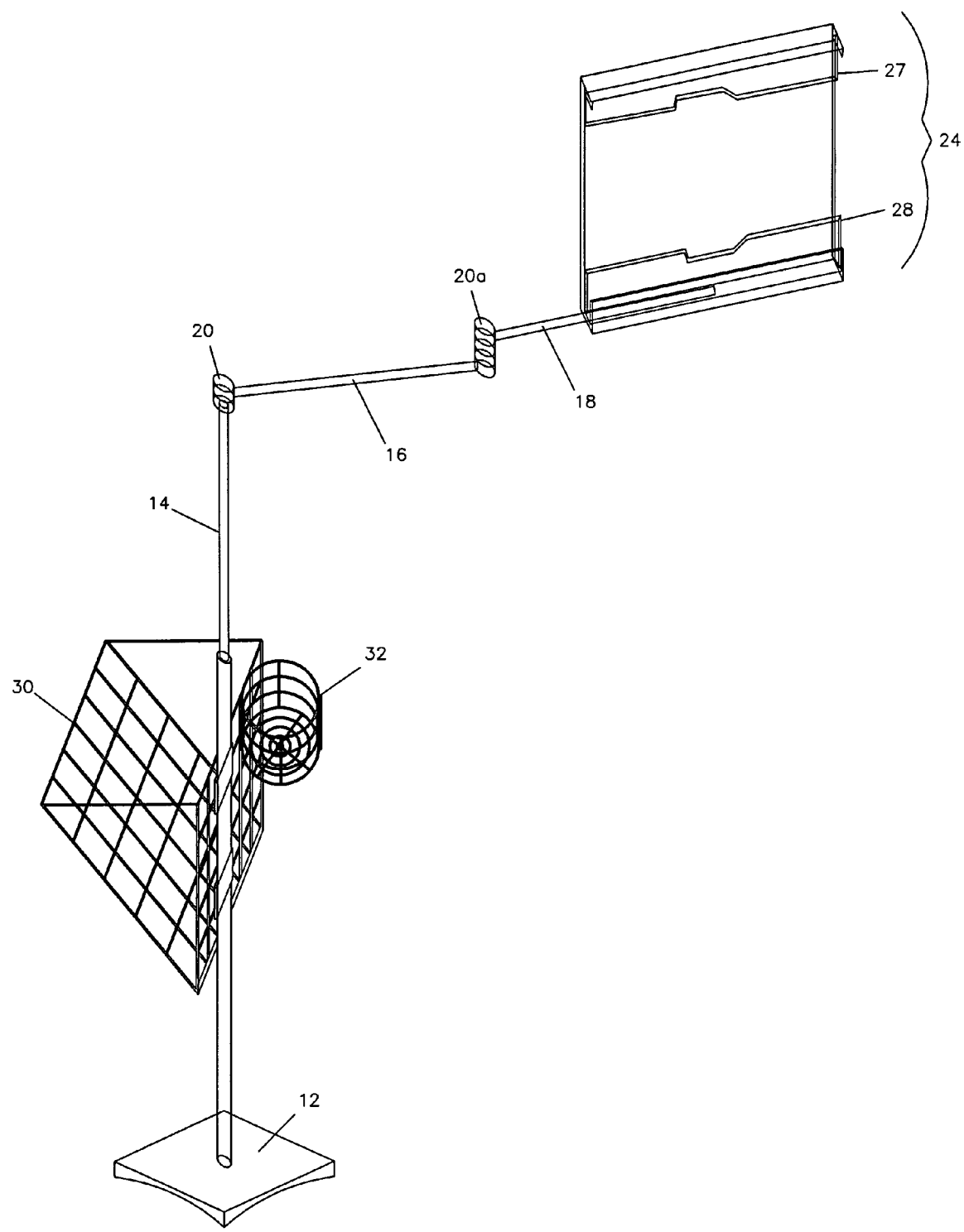
FIG. 7 is a perspective view of the present invention.
Figure 8:
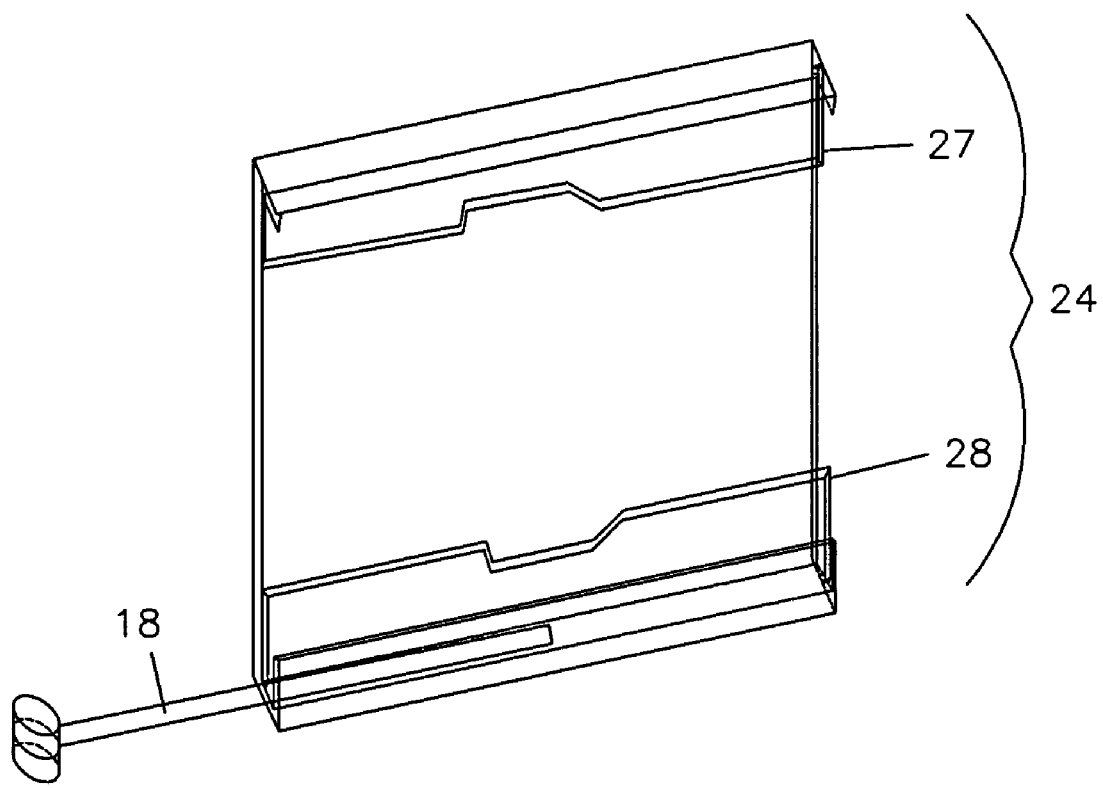
FIG. 8 is an isolated perspective view of the support table of the present invention.

A support table 24 is attached to the end second horizontal bar member 18. The support table 24 itself may swivel upward or downward. The support table preferably is constructed of a metallic material. As shown in FIG. 1, it may have a magazine clip 27 on the top to hold papers and other materials and one on the bottom 28. As shown, the embodiments include a magazine rack 30 and cup holder 32. As shown in FIG. 2, the magazine clips 26, 28 are shown in detail. The magazine clips 26, 28 pull outward and support a book, magazine, etc.

The present invention may be constructed from a variety of materials, including steel, aluminum, plastics and even wood. The present invention has been described with reference to the enclosed FIGURES. It is to be noted and appreciated that the true nature and scope of the present invention is to be determined with reference to the claims appended hereto.

The invention claimed is:

1. A mechanism for supporting writing and reading materials in a bath comprising:
   a weighted base member having an arced bottom to support the mechanism;
   a vertically extending, telescoping pole member extending upward from the base;
   a magazine rack attached to the vertically extending, telescoping pole member;
   a cup holder attached to the vertically extending, telescoping pole member;
   a first horizontal bar member affixed at a swivel at the top of the vertically extending pole member;
   a second horizontal bar member pivotably affixed to the first horizontal bar member; and
   a support table affixed to the second horizontal bar member.

\* \* \* \* \*